United States Patent [19]
Somerville et al.

[11] 3,875,383
[45] Apr. 1, 1975

[54] CONTROL SYSTEM FOR AVERAGE VALUE SETPOINT

[75] Inventors: Gerald H. Somerville; Maris A. Straumanis, both of Columbus, Ohio

[73] Assignee: Industrial Nucleonics Corporation

[22] Filed: Mar. 29, 1973

[21] Appl. No.: 346,034

[52] U.S. Cl....... 235/151.13, 235/150.1, 235/151.1, 425/141, 131/21 R
[51] Int. Cl.................. G06g 7/66, G05b 13/02
[58] Field of Search......... 235/151.13, 151.1, 150.1, 235/151.35; 425/141

[56] References Cited
UNITED STATES PATENTS

| | | | |
|---|---|---|---|
| 3,478,808 | 12/1967 | Adams | 235/151.1 |
| 3,515,860 | 6/1970 | Fitzgerald | 235/151.13 |
| 3,599,288 | 8/1971 | Eakman | 425/141 |
| 3,648,035 | 3/1972 | Hart et al. | 235/151.13 |
| 3,666,621 | 5/1972 | Adams | 235/151.35 |

OTHER PUBLICATIONS
TAPPI, Target Optimization Control for Automatic Maintenance of Product Factors at Limits TAPPi, 25th Engineering Conference, Oct. 1970, (Proceedings).

Primary Examiner—Felix D. Gruber
Attorney, Agent, or Firm—William T. Fryer, III; Allan M. Lowe; C. Henry Peterson

[57] ABSTRACT

A system for controlling the setpoint for the average value of a material property included a means for monitoring the property to derive a first signal indicative of the property values. A computer means responds to the first signal to derive second and third signals respectively indicative of the spread of values of the first signal over relatively short and long time intervals. In response to the spread of values indicated by the second signal exceeding a first statistically expected value, based on the number of property values derived from the monitoring equipment over the relatively short time interval, a flag signal is derived. A further flag signal is derived in response to the spread of values indicated by the third signal exceeding a second statistically expected value based on the number of property values derived over a longer time interval. The second statistically expected value changes as the number of samples of the property increases from the time when a particular long term computation cycle began. In response to either of the flag signals being derived, the computation cycles are re-initiated and a change is made in the average value setpoint in response to the difference signal which resulted in the derivation of the flag signal.

30 Claims, 3 Drawing Figures

CONTROL SYSTEM FOR AVERAGE VALUE SETPOINT

FIELD OF INVENTION

The present invention relates generally to systems for controlling a setpoint for the average value of a material property and, more particularly, to a system wherein the average value setpoint is susceptible to change with variable periodicity.

BACKGROUND OF THE INVENTION

It is known that the average value of a material property is desirably controlled as a function of the statistics of the property. In general, as the spread of property values decreases, the average value setpoint can be translated toward a limit value, and as the spread of values increases the average value setpoint is translated away from a limit value. The spread of values can be determined by the variance or square of the standard deviation of the property values, or by determining the amount of material that is considered to have a value outside of a limit value; the latter type of system for determining the spread of values is frequently referred to as fraction or percent defective. Systems of this general nature are disclosed in U.S. Pat. Nos. 3,515,860, 3,622,448, 3,648,035, and in the copending application Ser. No. 189,252 of David A. Spitz entitled "Control System," filed Oct. 14, 1971 commonly assigned with the present invention.

In the prior art systems it is generally the practice to periodically compute the spread of values and change the average value setpoint in response to the periodically derived spread of values indication. Systems of this type generally have the disadvantage of not being capable of responding very rapidly to transient changes in the property being measured, due for example to inhomogeneity of the material forming the product or changes in the characteristics of the machine forming the product. In addition, if a gradual change in the material property being measured should occur, and the gradual change occurs toward the end of the period, the effects of the gradual change are not reflected in a change of average value setpoint for, perhaps, a considerable length of time. The prior art systems have the further disadvantage that calculations for changes in the average value setpoint are performed occasionally when there is no need to make such calculations. This is because the operation of the process may be quite stable so that the setpoint will seldom need correcting.

BRIEF DESCRIPTION OF THE INVENTION

In accordance with the present invention, changes in the average value setpoint are performed only when needed in response to either relatively long term or short term changes in the statistics of the material property being measured. The amount of setpoint change is dependent upon a statistically derived confidence factor depending on the number of measurements and the deviation of the measured spread of values from a setpoint value for the spread of values as determined over either a short or 2 long time interval. The spread of values measurement can be indicated from a measurement of fraction defective.

The certainty of a fraction defective statistical measurement is increased as the number of samples included in the measurement increases. Therefore, the confidence which can be placed in a measured value of fraction defective continuously increases as the number of samples used to determine the fraction defective value increases. The uncertainly in the values of the gauge measurements effectively decreases as the number of samples increases.

In the system of the present invention, a statistically expected spread of values derived from the confidence factor is computed and compared with the measured spread of values. In response to the measured spread of values exceeding the expected spread of values a new setpoint signal is derived that is proportional to the difference between the measured and expected spread of values indications. Thereby, changes in the average value setpoint are provided, on a long term basis, only as needed and in the amount necessary.

To enable the average value setpoint to be varied in response to transient changes in the material property being monitored, the output of the guage is periodically examined to determine the measured spread of values over the relatively short time interval. This spread of values is compared with a statistically expected spread of values and in response to the comparison indicating that the measured spread of values exceeds the expected spread of values a change in the average value setpoint is effected.

To provide the aperiodic changes in the average value setpoint, the computers for the measured spread of values are reset each time that a change in the average value setpoint is calculated. If the long term spread of values computer were not reset each time a change in the average value setpoint was calculated, erroneous results would occur and the system would be considering values derived in accordance with a prior average setpoint.

We are familiar with an article written by Michael P. Grant entitled "Target Optimization Control For Automatic Maintenance Of Product Factors At Limits" which appeared in the proceedings of a TAPPI symposium in October 1970. In the Grant article there is disclosed the concept of inhibiting control action by inclusion of a dead band if fraction defective error is sufficiently small. The article also indicates that expected sudden process changes may make an anticipatory type of action desirable, since a large number of samples are required for highly accurate average value target setpoint control. The article also indicates that control of the average value setpoint can be obtained through a "large error control" which makes a "rough" estimate of fraction defective based on fewer samples and then makes a statistically valid partial correction if the fraction defective indication differs greatly from a setpoint value for fraction defective. The article also indicates that additional samples can be accumulated prior to a change in average value setpoint if the difference of the measured fraction defective is not large relative to the fraction defective setpoint. There is, however, no disclosure in the Grant article of computing a statistically expected spread of value which is continuously reused in accordance with the number of samples accumulated, nor is there the concept of providing control action in response to the difference between the measured spread of values and the statistically expected spead of values. These concepts have enabled us to provide an actual, practical system for controlling aperiodically an average value setpoint as a function of measured spread of values.

It is, accordingly, an object of the present invention to provide a new and improved system for varying an average value setpoint for a property as a function of the spread of the property values.

An additional object of the invention is to provide a new and improved aperiodic system for controlling a setpoint average value for a property in response to statistical variations of the property.

An additional object of the invention is to provide a new and improved system for controlling an average property setpoint in response to long term and short term statistical variations of the property.

An additional object of the invention is to provide a system for aperiodically changing an average setpoint value for a property as a function of the difference between the monitored spread of values and a statistically expected spread of values.

The above and still further objects, features and advantages of the present invention will become apparent upon consideration of the following detailed description of several specific embodiments thereof, especially when taken in conjunction with the accompanying drawing.

DETAILED DESCRIPTION OF THE DRAWING

Figure 1:
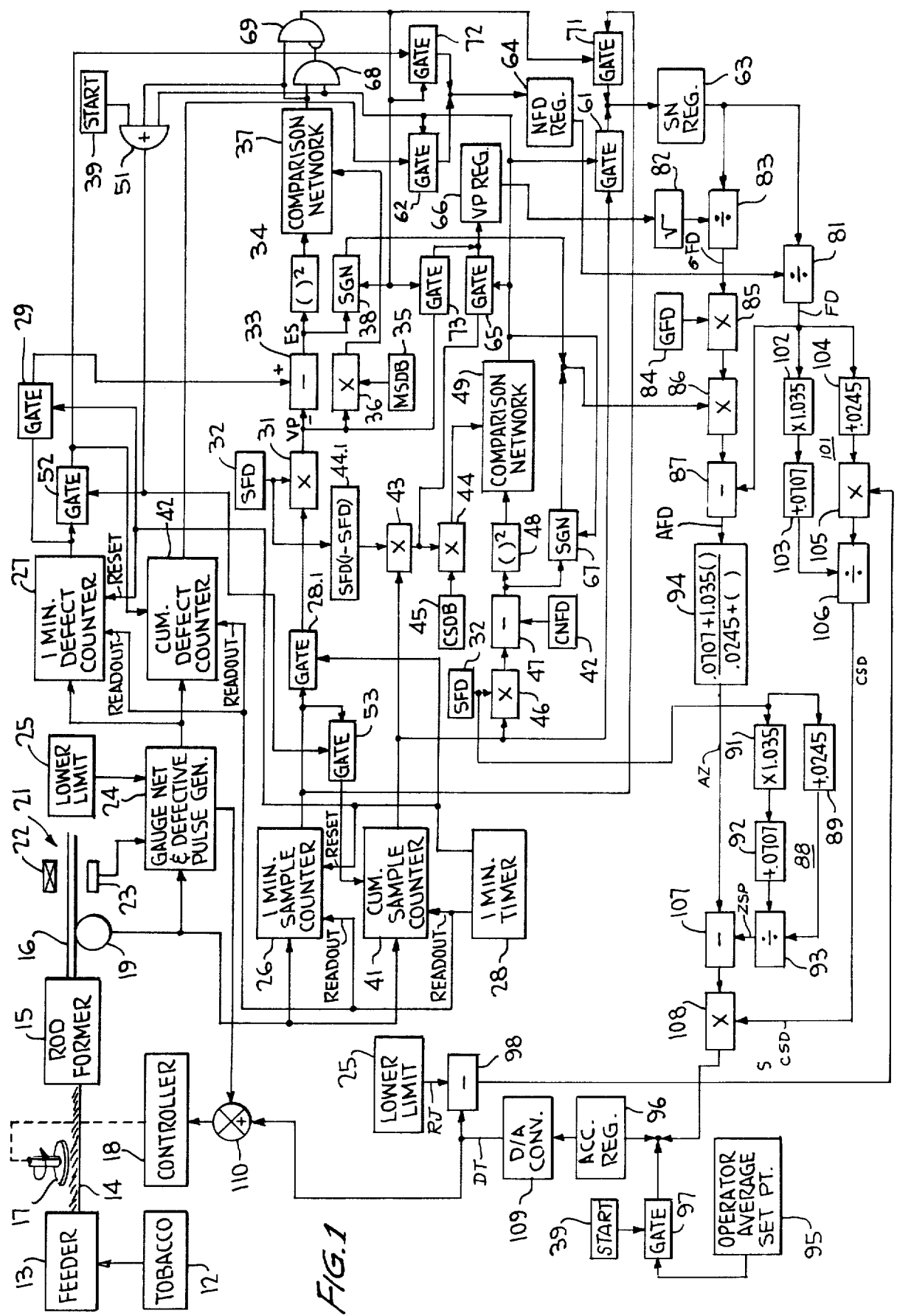
FIG. 1 is a schematic, block diagram of the principles of the invention as applied to a tobacco making machine.

Reference is now made to FIG. 1 of the drawing wherein there is illustrated a system for controlling the average weight of cigarettes in accordance with the statistical properties thereof and in accordance with the present invention. Tobacco from an external source 12 is delivered to feeder apparatus 13, thence to conveyor belt 14 and rod former 15. The amount of tobacco conveyed between feeder 13 and rod former 15, and therefore, the weight of tobacco in rod 16 that emerges from former 15, is controlled in response to the vertical position of rotary knife 17 above belt 14. The vertical position of rotating knife 16 is varied by automatic controller 18 in a manner familiar to those skilled in the art. Rod 16 emerging from former 15 is translated by well known means to a cutter which produces individual, predetermined length cigarettes which are later sorted and packaged. The velocity of the cigarette rod emerging from former 15 is monitored by tachometer generator 19 which derives one output pulse for each length of rod commensurate with a cigarette of the type being manufactured.

The density properties of rod 16, as it emerges from former 15, are monitored with a nucleonic gauge 21 comprising penetrating radiation source 22 and ionization detector 23, positioned on opposite sides of the rod. Detector 23 derives a d.c. output signal voltage inversely proportional in amplitude to the density of rod 16. The output signal of detector 23 is fed to a gauge network and defective pulse generator 24. Gauge network and defective pulse generator 24 may take a form as described in U.S. Pat. No. 3,648,035 to Hart et al., and includes means for deriving a d.c. signal proportional to the weight of material in rod 16, as well as a pulse for each cigarette having a weight less than a lower limit value determined on a predetermined basis by the machine operator. To these ends, the output of tachometer generator 19 is supplied to gauge network and defective pulse generator 24, as is a preset d.c. signal level derived from source 25, proportional to the lower limit.

To determine if the statistical spread of values for the weight of the cigarettes is less than the predetermined value over a relatively short time interval (e.g., 1 minute) it is necessary to measure the total number of samples and the number of defective samples, i.e., the quantity of measurements, during the time interval. In the cigarette forming system, one cigarette is considered as one sample and if that cigarette has a weight less than the lower limit value indicated by source 25, that sample is considered as defective. To these ends, 1 minute sample counter 26 and 1 minute defective counter 27 are provided and are respectively responsive to the output signals of tachometer generator 19 and gauge network and defective pulse generator 24. Each of counters 26 and 27 is provided with a readout input terminal to enable the count stored in the counters to be read out. The counters 26 and 27 are also provided with reset input terminals to enable the counts therein to be restored to a zero reading. To control readout and reset of counters 26 and 27 one minute timer 28 is provided. Timer 28 includes two output terminals, each of which is supplied with a pulse once a minute. One terminal of timer 28 is connected to the readout terminals of counters 26 is 27, while the other terminal s connected to the reset input terminals of the counters. The pulses are derived on the two output terminals of timer 28 with a slight time displacement so that the readout pulse is derived prior to the reset pulse; sufficient time is provided between the two pulses to enable certain operations (described infra) to be performed between the derivation of the two pulses, whereby the counters are maintained at the same count at the time they are reset as existed therein at the time of readout.

The apparatus checks the outputs of counters 26 and 27 to determine if during the previous one minute period the spread of values for the weight of the cigarette in rod 16 exceeds a statistically expected value for the spread of values. The expected spread of values is based upon statistics and upon the number of samples taken during the last minute. The statistical properties of the system determine the confidence with which the measuring system can evaluate the spread of value of the property. Typically, the confidence values lie in the range between approximately 80 percent and approximately 99 percent. For a relatively low number of samples, the confidence is not as great as for a larger number of samples. Therefore, to provide an indication that the measuring system indication spread of values exceeds a statistically expected value, for the 1 minute sampling time, the apparatus multiplies a setpoint which is selected in accordance with the characteristics of the statistical system by a relatively large quantity indicative of the expected number of defective samples when making a comparison with the indication of the number of measured defective samples during the minute.

The spread of values indication is calculated in the specifically disclosed embodiment of FIG. 1 by determining the amount of defective samples in the total sample. The number of defective samples is compared with the expected number of defective samples, and the difference between the two numbers is squared to determine an indication of a variance value, variance being the square of standard deviation.

To these ends, the counts of counters 26 and 27 are read out and passed through gates 28.1 and 29 under the control of readout pulses from timer 28. Counters 26 and 27 derive multi-bit, parallel binary signals that are indicative of the counts in the counters. The signal derived from counter 26, as passed through gate 28.1, is applied as one input of multiplying matrix 31, having a second input from source 32 that is indicative of an operator input value for the fraction defective setpoint, i.e., the fraction of the total number of cigarettes which the manufacturer is willing to make which have weight less than the limit value determined by source 25. The multi-bit, parallel output signal of multiplier 31 is therefore indicative of the expected number of rejects if the system is operating on the fraction defective setpoint determined by source 32;. The output signal of multiplier 31 is compared with the number of defective cigarettes during the last minute, as fed through gate 29, in subtraction matrix 33. Subtraction network 33 thereby derives an output signal, ES, indicative of the error between the measured fraction defective and the expected fraction defective for the last minute. The error signal is squared in squaring matrix 34 which derives an output signal indicative of the variance, and therefore spread of values, of the gauge output for the last minute, i.e., the last minute variance of the measured process.

The last minute variance of the measured process is compared with a quantity derived from a multiple of the statistical system variance for the last minute (last minute gauge variance). The multiple, MSDB, is derived from source 35 and is predetermined depending upon the confidence level desired. Typically, the value of MSDB is between two and nine for a variance confidence level between approximately 80 percent and approximately 99 percent. These confidence levels are associated with the standard deviation (sigma) values of 1.4 and 3, which are squared to obtain the stated MSDB values. The magnitude derived from source 35 is multiplied by the output of multiplying matrix 31 in a further multiplying matrix 36, which derives a multi-bit parallel binary output signal that is fed to comparison network 37, having a further input responsive to the output of squaring matrix 34. In response to the output of squaring matrix 34 exceeding or being equal to the quantity represented by the output signal of multiplying matrix 36, comparison network 37 derives a flag signal to indicate that the square of the excess or deficiency in the number of defective items during the last minute exceeded the product of the expected number of defective items, and the predetermined multiplication factor, MS B. The significance of a flag signal being derived from comparison network 37 is that a relatively high frequency transient occurred to the process forming tobacco rod 16 during the last minute and that a shift in the average value of the weight of the cigarettes should be made. To determine the direction in which the average value for the cigarettes in rod 16 should be shifted, the output signal of subtraction matrix 33 is examined with regard to polarity. To this end, the most significant bit of the output signal of subtraction matrix 33, which is indicative of polarity, as is usually the case in digital systems, is fed to sign indicating register 38, which is generally enabled in response to a flag signal being derived from comparison network 37.

In response to a flag signal being derived by comparison network 37, it is necessary to initialize certain counters and computing elements included in the computer of the present invention. These elements are also initialized in response to an operator activating a start control 39. These initializing operations are discussed infra, when the various additional elements are discussed.

The portion of the computer including counters 26 and 27, gates 28.1 and 29, matrices 31, 33, 34, 36 and comparison network 37 is periodically activated at a rate of once per minute. Thereby, the system is constantly deriving an indication as to whether a short term variance is occurring which requires a change in the average weight of the cigarettes formed in rod 16. It is for this reason that counters 26 and 27 are reset once a minute by an output signal of timer 28.

In the event that there is no substantial transient variation in the spread of values of the sampled cigarettes, as determined by the absence of a flag output of comparison network 37, the system determines an indication of the cumulative number of cigarettes and an indication of the cumulative number of defective cigarettes. To these ends, output pulses of tachometer generator 19 and gauge network and defective pulse generator 24 are respectively applied to cumulative sample counter 41 and cumulative defective counter 42. Counters 41 and 42 include readout input terminals similar to those of counters 26 and 27. In addition, counters 41 and 42 include parallel read-in circuitry so that initial values can be set therein. Cumulative counters 41 and 42 are read out once every minute in response to the same output signal of timer 28 as is fed to the readout terminals of counters 26 and 27. Resetting of counters 41 and 42 is not periodic but is dependent upon when a change in the setpoint value for the average weight of cigarettes in rod 16 occurs, as described infra.

Consideration is now given to the apparatus for determining if the cumulative spread of values exceeds the statistically expected spread of values. As the number of samples increases, the multiple for the spread of values setpoint signal effectively continuously decreases from the time the last resetting of counters 41 and 42 occurred. The multiple can effectively decrease because the number of samples is increasing and therefore the gauge indication is a more accurate reflection of the actual number of defective samples.

To these ends, an indication of the variance of the cumulative expected rejects is calculated by feeding the output signal of cumulative sample counter 41 to multiplying matrix 43, having a second input equal to the fraction defective setpoint times one minus the fraction defective setpoint, as derived from multiplying and addition network 44.1, having an input responsive to the fraction defective setpoint source 32. The signal derived from matrix 43 is fed to a further multiplying matrix 44, having an input signal, CSDB, derived from source 45 that is indicative of the confidence level desired of the gauging system. The quantities CSDB and MSDB respectively derived from sources 45 and 35, differ from each other only with regard to a constant factor concerning expected variance values for the cumulative and one minute fraction defective computations.

The signal derived from multiplying matrix 44 is compared with the a signal indicative of the square of the excess or deficiency in the cumulative number of defective items to derive an indication as to whether a change in average value should be made on the basis of a long term evaluation of variations in the weight of the cigarettes in rod 16. To this end, the output of cumulative sample counter 41 and the fraction defective setpoint signal, as derived from source 32 (which is illustrated for convenience as a separate box relative to the input of multiplier 31) are multiplied together in multiplying matrix 46, the output of which is a parallel binary signal indicative of the expected number of defective cigarettes in rod 16. The output of multiplier 46 is compared with the measured number of cumulated defective cigarettes, as derived from counter 42 (CNFD), in subtraction matrix 47, which derives an error signal between the expected and actual number of defective samples. The error output signal of subtraction matrix 47 is fed to squaring matrix 48 which derives a binary output signal indicative of the variance of the samples for the entire time since last resetting of counters 41 and 42. The output signal of squaring matrix 48 is compared with the output signal of multiplying matrix 44 in comparison network 49, which derives a flag signal when the signal derived from squaring matrix 48, exceeds the signal, derived from multiplying matrix 44.

In response to either of the signal respectively indicative of the relatively short term or the cumulative measured variance exceeding the expected values, the system is reset after certain computed quantities have been read out and fed to a computing means for changing the setpoint value for the average weight of a cigarette. Generally, the readout quantities are derived from either the relatively short term or the cumulative defective computing channels. In the event that both channels simultaneously indicate that a change in average cigarette weight setpoint should be made, signals are read out from the cumulative channel. The system is also initialized in response to the operator activating source 39 to indicate a start condition.

To these ends, the flag output signals of comparison networks 37 and 39, as well as start source 39, are fed to OR gate 51 which derives an enable signal for gates 52 and 53. Gates 52 and 53 are normally closed, but when enabled, feed the parallel, multi-bit binary signals from counters 26 and 27 to counters 41 and 42, respectively. The signals fed into counters 41 and 42 cause the previous signals stored in those counters to be erased and replaced with the signals of counters 26 and 27 to effectively provide resetting. Thereby, counters 41 and 42 store, at the beginning of each new computation interval, signals indicative of the number of samples and the number of defective samples in the cigarette rod during the preceding minute when the system was under automatic control. These values are established as initial values for the cumulative values so that there is some prior record of the performance of the system.

In response to a flag signal being derived by comparison network 49 there are fed to a computing means for a new average value setpoint, signals indicative of: number of samples since last change in average value setpoint; number of defective samples since last change of average value setpoint; expected number of defective samples since last change of setpoint; and the polarity of the deviation from the expected number of accumulated defective samples. To these ends, there are provided multi-bit parallel gates 61 and 62 which are respectively provided for the multi-bit outputs of cumulative sample counter 41 and cumulative defect counter 42. Gates 61 and 62 are normally closed, and are enabled in response to a flag signal being derived by comparison network 49. Gates 61 and 62 drive individual stages of sample number register 63 and fraction defective sample number register 64 so that these registers store counts indicative of the total number of samples and the defective number of samples. To store an indication of the expected cumulative number of defective samples, there is provided gate 65 which is responsive to the multi-bit output of multiplier 43. The output signal of gate 65 is applied to register 66 in response to a flag signal being derived from comparison network 49. To determine the polarity of the deviation from the expected cumulative number of defective samples, the most significant bit output of subtraction matrix 47 is fed to gated one-bit register 67 in response to the flag being derived by comparison network 49. It is to be understood that appropriate delay means or registers are provided to enable the signals from matrices 43 and subtractor 47 to be passed to register 66 and 67 even though the flag is derived by comparison network 49 subsequently to the original derivation of the signal magnitudes by matrices 43 and 47.

In response to the 1 minute channel comparison network 37 deriving a flag signal, similar operations are performed. However, if the comparison networks 37 and 49 of both the one minute and cumulative channel simultaneously derive flag signals, output signals are derived exclusively from the cumulative channel, to the exclusion of the 1 minute channel. To this end, the simultaneous occurrence of flag signals from comparison networks 37 and 49 is detected by AND gate 68 deriving a binary one signal. The binary one output signal of AND gate 68 is applied as an inhibit input to inhibit gate 69, having a second input responsive to the output signal of comparison network 37. Thereby, a binary one signal is derived from inhibit gate 69 in response to the one minute channel comparison network 37 deriving a flag signal to the exclusion of the cumulative channel comparison network 49 deriving a flag signal.

The binary one output signal of inhibit gate 69 is applied in parallel to gates 71, 72 and 73, as well as to gated register 38. Gates 71 and 72 are respectively responsive to the output signal of 1 minute sample counter 26 and the gated output signal of 1 minute defect counter 27. Output of gates 71 and 72 respectively drive registers 63 and 64, whereby these registers are loaded with signals indicative of the number of samples during the last minute and the number of defective samples in the last minute if the 1 minute channel indicates a change in the statistical properties of rod 16. Gate 73 is responsive to the output signal of multiplying matrix 31, indicative of the expected number of defective samples during the preceding 1 minute period, and drives register 66 with the output of the multiplying matrix. Gated sign register 38 is also enabled in response to the output of inhibit gate 69.

To determine the change in setpoint value, the apparatus of the present invention utilizes the same principles as are disclosed in the copending application of David A. Spitz, Ser. No. 189,252, filed Oct. 14, 1971, and commonly assigned with the present invention. In particular, the fraction defective is found by combining the number of defective samples and the total number of samples, and an approximation of process standard deviation is calculated by combining the fraction defective value with an indication of the average setpoint value and the limit value.

Specifically, several quantities are computed in accordance with $$FD = \frac{NFD}{SN} \quad (1)$$

$$\sigma FD = \frac{\sqrt{VP}}{SN} \quad (2)$$

$$AFD = FD - \{[\sigma FD][GFD][SGN(EFD)]\} \quad (3)$$

$$AZ = \frac{0.0707 + 1.035(AFD)}{0.0245 + AFD} \quad (4)$$

$$ZSP = \frac{0.0707 + 1.035(SFD)}{0.0245 + SFD} \quad (5)$$

$$CSD = \frac{[0.0245 + (FD)][(DT) - (RJ)]}{0.0707 + 1.035(FD)} \quad (6)$$

$$NT = DT + (ZSP - AZ)(CSD) \quad (7)$$

where FD represents the measured fraction defective, NFD represents the measured number of defective samples, SN represents the total number of samples measured, $\sigma FD$ represents the expected variance of the fraction defective, VP represents the expected number of defective samples, AFD represents the usable fraction defective error, GFD represents a predetermined gain factor indicating the percentage of the calculated change which should be made for damping purposes SGN(EFD) represents the polarity or sign of the deviation of the measured number of defective samples from the expected number, AZ represents the Gaussian normalized usable fraction defective, ZSP represents the Gaussian normalized fraction defective setpoint, CSD represents the measured control standard deviation, DT represents the prior average value setpoint, RJ represents the reject limit, NT represents the new average value setpoint and SFD represents the fraction defective setpoint previously discussed. The equations are derived by approximations at the tails of the normal (Gaussian) curve, in a region appropriate to the characteristics of the measured and controlled process. The specific figures given above are based on a fraction defective range of between 0.1 percent to 6 percent, which is a reasonable fraction defective range for a cigarette manufacturing machine.

To calculate the value of NT, the measured fraction defective is calculated by supplying the signals in registers 63 and 64 as divisor and dividend inputs to dividing matrix 81, the output of which is a multi-bit binary signal representing FD = NFD/SN. The expected variance of the fraction defective, $\sigma FD$, is determined by feeding the VP signals stored in register 66 to square rooting matrix 82, the output of which is combined in division matrix 83 with the SN output signal of register 63. Division matrix 83 derives a multi-bit binary output signal $\sigma FD = $ VP/SN. To determine the quantity AFD, the $\sigma FD$ output of division matrix 83 is multiplied by the predetermined damping factor, GFD, stored in signal source 84. The multiplication operation is performed in multiplying matrix 85, the output signal of which is selectively modified in polarity by multiplying matrix 86, which is selectively responsive to the polarity indicating signals stored in one of registers 38 or 67. The sign indicating signal of gated register 38 is fed to matrix 86 only when a flag signal is derived by comparison network 37 to the exclusion of comparison network 49. If a flag signal is derived from comparison network 49 the signal from gated register 67 is fed to multiplying matrix 86. The output signal of multiplying matrix 86 is subtracted from the fraction defective output signal of division matrix 81 in subtraction matrix 87, the output signal of which is AFD.

To provide an indication of the Gaussian normalized fraction defective setpoint, ZSP, the $\sigma FD$ output of fraction defective setpoint signal source 32 is applied to network 88. Network 88 includes a pair of parallel branches, in one of which the quantity 0.0245 is added to $\sigma FD$ in matrix 89. In the other parallel channel, the $\sigma FD$ quantity is multiplied by the constant 1.035 in matrix 91, the output of which is added to the fixed quantity 0.0707 in matrix 92. The output signals of matrices 89 and 92 are applied as dividend and divisor inputs to division matrix 93, the output of which is a multi-bit, binary signal represented as $0.0707 + 1.035(\sigma FD)/0.0245 + \sigma FD$. To determine an estimate of the Guassian normalized usable fraction defective, the output signal of subtraction matrix 87, AFD, is supplied to computing network 94. Computing network 94 may take the same form as computing network 88 to derive an output signal:

$$AZ = 0.0707 + 1.035(AFD)/0.0245 + AFD.$$

To compute an indication of a measured control standard deviation, the fraction defective output of division matrix 81 is combined with a signal indicative of the difference between the average value setpoint and the limit value for the weight of a sample. The indication of average value setpoint is derived initially from an operator controlled multi-bit, parallel binary signal source 95. The signal from source 95 is selectively fed to accumulator register 96 through gate 97 in response to the operator activating start control 39 to open the normally closed gate. After the initial entry of the operator controlled average value setpoint, the contents of accumulator 96 are incremented in accordance with the present invention. The signal stored in accumulator register 96 is applied as one input to subtraction matrix 98, the other input of which is responsive to the signal from lower limit setpoint source 25. Subtraction matrix 98 derives an output signal (DT - RJ) where DT = average value setpoint, and RJ = limit value that is applied to computer network 101 that is also responsive to the output of division matrix 81 to derive the signal CSD.

Computer network 101 includes a pair of parallel channels responsive to the fraction defective output signal of division network 81. In one channel is matrix 102 wherein the fraction defective output signal of division matrix 81 is multiplied by the factor 1.035. The output signal of matrix 102 is added to the fixed quantity 0.0707 in matrix 103. The second channel of computer 101 includes an addition matrix 104 wherein the FD output of matrix 81 is added to the fixed quantity 0.0245. The output signal of matrix 104 is multiplied by the difference output signal of matrix 98 in multiplying matrix 105. The output signal of matrix 105 is divided by the output signal of matrix 103 in division matrix 106 to form the CSD signal.

To increment the signal in accumulator register 96, the AZ output signal of network 94 is subtracted from the ZSP output signal of network 88 in subtraction matrix 107. The output signal of matrix 107 is multiplied by the CSD output signal of network 101 in multiplication matrix 108, the output of which is applied to accumulator register 96.

The signal derived from accumulator register 96 is thereby an indication of a setpoint for the average weight of a sampled cigarette in rod 16. The signal in accumulator register 96, being in multi-bit, binary form, is converted by digital to analog converter 109 into a d.c. voltage that is scaled identically with the d.c. output voltage of gauge network and defective pulse generator 24. The d.c. output signals of converter 109 and gauge network 24 are combined in difference network 110 which derives a d.c. signal commensurate with the deviation of the measured value of a cigarette from the setpoint value therefor. The error signal derived from difference network 110 is supplied to controller 18 for determining the vertical position of knife 17 and therefore the average weight of the cigarettes.

The discrete nature of the cigarettes enables the system of FIG. 1 to function in response to actual numbers of samples and actual number of defective samples. Because actual numbers of samples and defects are counted in the FIG. 1 system, expected variance is actually treated as a normalized variance with regard to the number of samples. Hence, the output signals of multiplying matrices 31 and 43 are directly proportional to the number of samples actually counted by counters 26 and 41. These quantities are actually compared with signals indicative of the square of the deviation in a number of samples in comparison networks 37 and 49. Thereby, the comparisons provided by networks 37 and 49 effectively derive flag signals in response to the measured spread of values exceeding a multiple of the expected value for the spread of values such that the multiple effectively continuously decreases as the number of samples of the property increases from the time the last flag signal was derived. This effective decrease of the multiple value of the spread of values signal (either MSDB or CSDB) occurs because of the linear relationship of the output of multipliers 36 and 44 to the number of samples and the squared relationship of the outputs of squaring matrices 34 and 48 to the number of samples.

Figure 2:
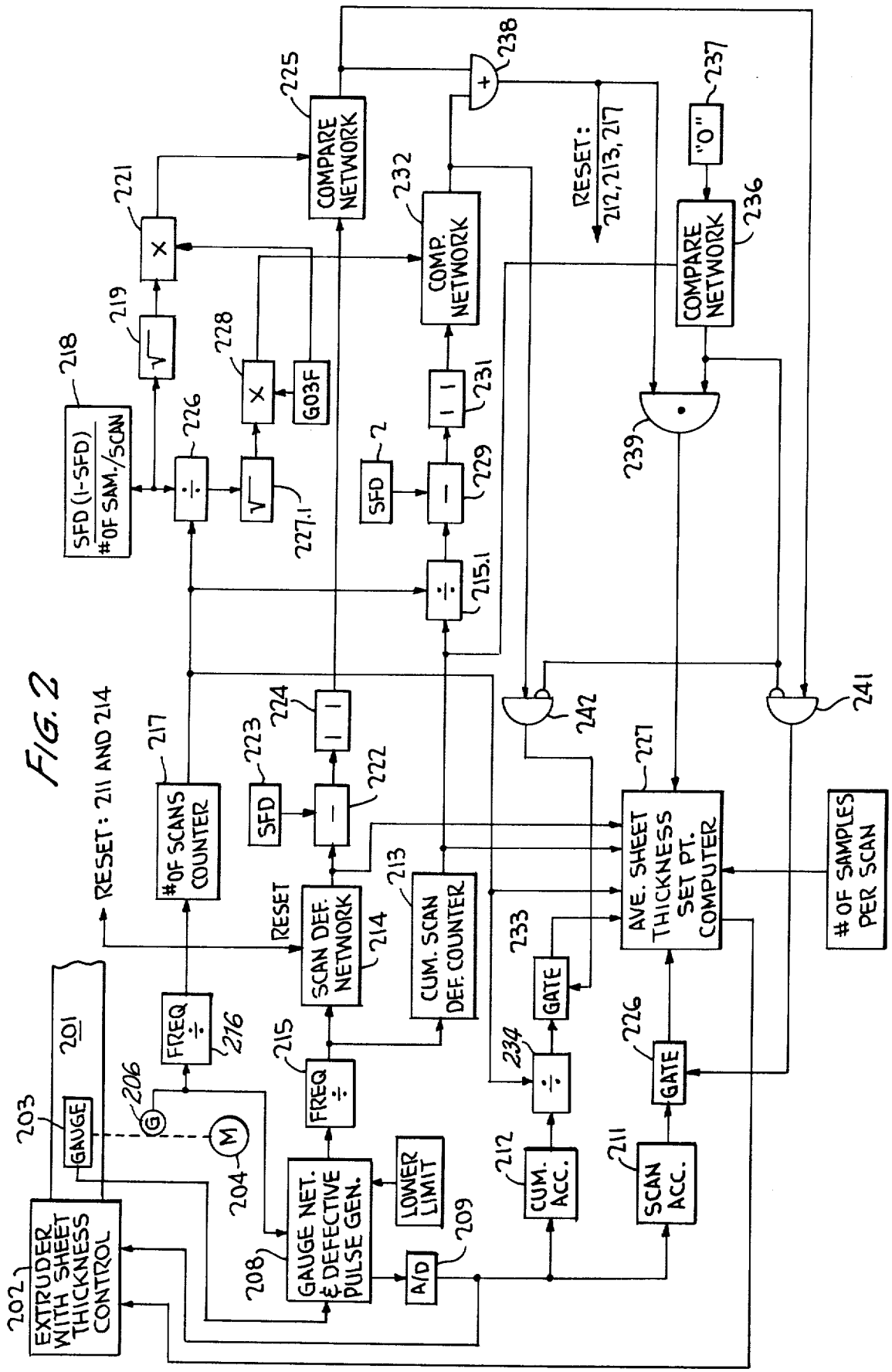
FIG. 2 is a block diagram of a portion of the system of the invention as applied to an extruder.

In other types of systems it is desirable to indicate actual quantity of measured material, as well as actual quantity of defective material. Such systems are typified by a scanning gauge monitoring an extruded sheet, as illustrated in the system of FIG. 2. In the system of FIG. 2, relatively short term indications of material quantity and amount of defective material are derived after each scan of the gauge. A further distinction between the system of FIGS. 1 and 2 is that in FIG. 2 a relatively small quantity of material is examined over the relatively short time interval and, therefore, a large number of samples is not available after the relatively short time interval. To enable a correction in the thickness of sheet manufactured by the extruder to be corrected after each scan, despite the relatively low number of samples, certain limiting operations are performed if the calculated fraction defective is zero. These limiting operations are not necessary in the system of FIG. 1 because the number of samples taken prior to any computations being performed is sufficiently large to generally prevent a zero number of defects being detected during a complete one minute sampling interval.

Reference is now made to FIG. 2 of the drawing wherein there is illustrated a portion of a computer system for determining a setpoint value for average thickness of plastic sheet 201 produced by an extruder 202 having a sheet thickness control system as described in the copending application of Straumanis, Ser. No. 222,103, filed Jan. 31, 1972. Sheet thickness measuring gauge 203 is scanned at right angles to the moving edges of sheet 201 between the sheet edges in response to drive imparted thereto by constant speed motor 204. Gauge 203 is scanned back and forth across sheet 201 repeatedly, and during each traverse a number of samples, typically forty, from different cross sheet regions are derived. To determine the cross sheet position of gauge 203, shaft 205 that drivingly connects motor 204 to gauge 203 is coupled to position sensing generator 206 that derives an output pulse each time a new sampled region across the width of sheet 201 has been traversed by gauge 203. Thereby, position generator 206 is analogous to tachometer generator 19, FIG. 1. Since there are many other parts of the system of FIG. 2 which are analogous to or similar to the system illustrated in FIG. 1, many of the details of the system illustrated in FIG. 1 have been excluded in FIG. 2. In discussing FIG. 2, emphasis is given to those aspects of the system which differ from the FIG. 1 system.

The output signal of scanning gauge 203 is applied to gauge network and defective pulse generator 208 which provides analog and count output signals corresponding with the analog and count output signals of network 24. The analog output signal of generator 208 is applied to analog-to-digital converter 209, which supplies a digital signal to the thickness controller for extruder 202, as described in the Straumanis application. The output signal of analog-to-digital converter 209 is also applied in parallel to scan accumulator 211 and cumulative accumulator 212, which enable calculated average values for the thickness of sheet 201 to be derived; these calculated values are utilized in the present embodiment in lieu of the setpoint values to calculate thickness setpoints for sheet 201.

To derive indications of the number of defective samples in each scan, as well as over a number of scans since the last time the average sheet thickness setpoint was changed, defect indicating output pulses of generator 208 are applied to cumulative scans defect counter 213 and single scan defect counter 214. The pulses are applied to counters 213 and 214 after having passed through frequency divider 215 that is set to frequency divide the number of output pulses of generator 208 by a number of samples in each scan of gauge 203. Therefore, the count stored in counter 214, which is reset to zero after each scan of gauge 203, is always proportional to the fraction of defective samples in a scan, rather than the actual number of defective samples in the scan. To enable the cumulative defect signal in counter 213 to indicate the actual fraction of defective samples over the cumulative number of scans, the output of the counter is applied to a dividend input of division matrix 215.1, having a divisor input responsive to an indication of the number of scans of gauge 203. To provide resetting of counter 214 and an indication of the number of scans of gauge 203 since the last time average sheet thickness setpoint was changed, the output signal of position indicating generator 206 is applied to frequency divider 216, which is set to a division factor equal to the number of samples per scan. In response to completion of a scan of gauge 203, frequency divider 216 derives an output pulse that is applied in parallel to a reset input terminal of counter 214 and to an input terminal of counter 217 which stores a signal indicative of the number of scans of gauge 203 since the last average sheet thickness setpoint variation was derived. The output signal of counter 217 is applied as the divisor input of division matrix 215.1, whereby the output signal of the matrix indicates actual fraction defective over the cumulative number of scans.

To determine if a change in the average sheet thickness setpoint should be made, measured fraction defective values are compared with statistically expected fraction defective values. The expected fraction defective values are multiplied by decreasing factors as the number of samples increases since the last average sheet thickness setpoint change occurred. The comparison of measured and expected fraction defective multiples is similar to the comparison made in the embodiment of FIG. 1. In both embodiments, measured indications of the spread of values are compared with multiples of an expected spread of values, with the effective values of the multiples decreasing as the number of samples increases.

To determine the expected fraction defective error for a single scan, there is provided a binary signal source 218 which derives an output signal that is effectively set by the operator and is responsive to fraction defective setpoint (SFD) and the number of independent samples taken during each scan of gauge 203 across sheet 201; this signal is represented by:

SFD(1-SFD)/N wherein:

N = number of independent samples per scan. The output signal of source 218 is applied to square root matrix 219, the output of which is multiplied in matrix 221 by a predetermined factor (GO3F) indicative of the confidence factor for the fraction defective measurement. Typically, the value of GO3F is set between 1.5 and 3.0, numbers that are approximately the square root of the 2.0 to 9.0 confidence factors in the FIG. 1 embodiment. The magnitude of the output signal of matrix 221 is thereby indicative of the expected variance of the fraction defective for a single scan of the gauge 203 across sheet 201.

The output signal of multiplier 221 is compared with the absolute value of the fraction defective error for one scan, as determined by subtracting a setpoint value for fraction defective from measured fraction defective. To these ends, the output of counter 214 is subtracted in matrix 222 from a fraction defective setpoint signal derived from source 223. The output signal of subtraction matrix 222 is applied to absolute value network 224, which derives a positive signal regardless of the polarity of the error signal derived from matrix 222. The signals derived from matrix 221 and network 224 are compared in comparison network 225 which derives a flag signal in response to the measured fraction defective error exceeding the expected fraction defective error magnitude. In response to a flag signal being derived from comparison network 225, cumulative scan counters 213 and 217 and cumulative accumulator 212 are reset to zero. In addition, the flag output of comparison network 225 enables the signal in scan accumulator 211 to be passed through normally closed gate 226 to average sheet thickness setpoint computer 227 which computes a new sheet thickness setpoint signal that is fed to the thickness controller for extruder 202.

To determine if the measured cumulative fraction defective signal derived from matrix 215.1 exceeds a multiple of the expected fraction defective, wherein the multiple decreases as the number of samples increases, the output signal of generator 218 is divided by the number of scans since the last change of average sheet thickness setpoint occurred. The number of scans since the last change is, derived by counter 217. The division operation is performed by matrix 226.1, which derives an output signal that is fed to square root matrix 227.1. Square root matrix 227.1 drives one input of multiplying matrix 228, the other input of which is responsive to the confidence factor GO3F.

The product output of multiplier 228 is compared with the absolute value of the cumulative scan fraction defective error. To these ends, the fraction defective setpoint signal from source 223 is subtracted from the measured fraction defective output signal of division matrix 215.1 in subtraction matrix 229. The cumulative scan fraction defective error signal derived from matrix 229 is fed to absolute value network 231, the output of which is supplied to comparison circuit 232, which is also responsive to the output of multiplier 228. In response to the measured fraction defective error magnitude, as derived from absolute value circuit 231, exceeding the expected fraction defective for the number of scans, as derived from multiplier 228, comparison network 232 derives a flag signal. The flag output signal of comparison network 232 is normally applied to reset each of: number of scans counter 217, cumulative scans defect counter 213 and cumulative accumulator 212. The flag signal of network 232 is normally passed as an enable input for gate 233 that feeds a signal indicative of the average thickness of sheet 201 to average sheet thickness setpoint computer 227. The input to computer 227 through gate 233 is derived by dividing the output of cumulative accumulator 212 by the number of scans count derived by counter 217, which division operation is performed by matrix 234.

Under certain circumstances, comparison networks 225 and 232 may derive flag signals when no defective samples have been measured. This can occur when the number of samples taken is so small that a negative fraction defective error signal is required to exceed the lower limit of the expected fraction defective output of multipliers 221 and 228. If no defective samples are monitored, an indication is provided that the average sheet thickness setpoint is excessively high and should be reduced.

To these ends, the signal read out of cumulative scan defective counter 213 at the end of each scan of the gauge 203 is compared in network 236 with a zero indicating signal derived from source 237. In response to the inputs to comparator 236 being the same, a flag signal is derived from the comparator. The flag signal derived from comparator 236 is applied as inhibit inputs for gates 241 and 242 which respectively normally pass the flag signals derived by networks 225 and 232. If either of comparison networks 225 or 232 derives a flag signal while a flag is derived from network 236, a flag signal is derived from AND gate 239 that is responsive to the flag signal outputs of networks 225 and 232, as fed through OR gate 238, as well as to the flag signal derived from network 236. The flag signal derived from AND gate 239 is fed to average sheet thickness setpoint computer 227 to change the equation for the CSD factor compared to the equation utilized in the system of FIG. 1 to compute CSD. In response to a flag signal being derived from AND gate 239, computer 227 determines the value of CSD as being directly proportional to the difference between an operator setpoint value for sheet average thickness minus the limit value for sheet thickness.

The proportionality constants employed by computer 227 differ from those employed by the average cigarette weight computer of FIG. 1 because a different statistical system is involved and the expected range of fraction defective in the FIG. 2 system extends from approximately 0.01 to 0.10, while the expected fraction defective in the system of FIG. 1 extends from 0.006 to 0.06. Therefore, in the FIG. 2 system, the normal calculation for CSD (when no flag signal is derived from AND gate 239) is:

$$CSD = \frac{(0.061 + FD)(\mu - RJ)}{0.16 + 0.47\, FD}$$

where $\mu$ equals the average value applied to computer 227 through either gate 226 or gate 233. For the special case wherein CSD is calculated by computer 227 in response to a flag signal being derived from AND gate 239, $CSD = 0.38\,(\mu_0 - RJ)$, where $\mu_0 =$ initial operator input for average sheet thickness setpoint. In the calculations of ZSP and AZ, the constants for the system of FIG. 1 are changed in the system of FIG. 2 as follows:

TABLE

| FIG. 1 | FIG. 2 |
|--------|--------|
| 0.0707 | 16.0 |
| 1.035 | 0.47 |
| 0.245 | 6.1 |

Figure 3:
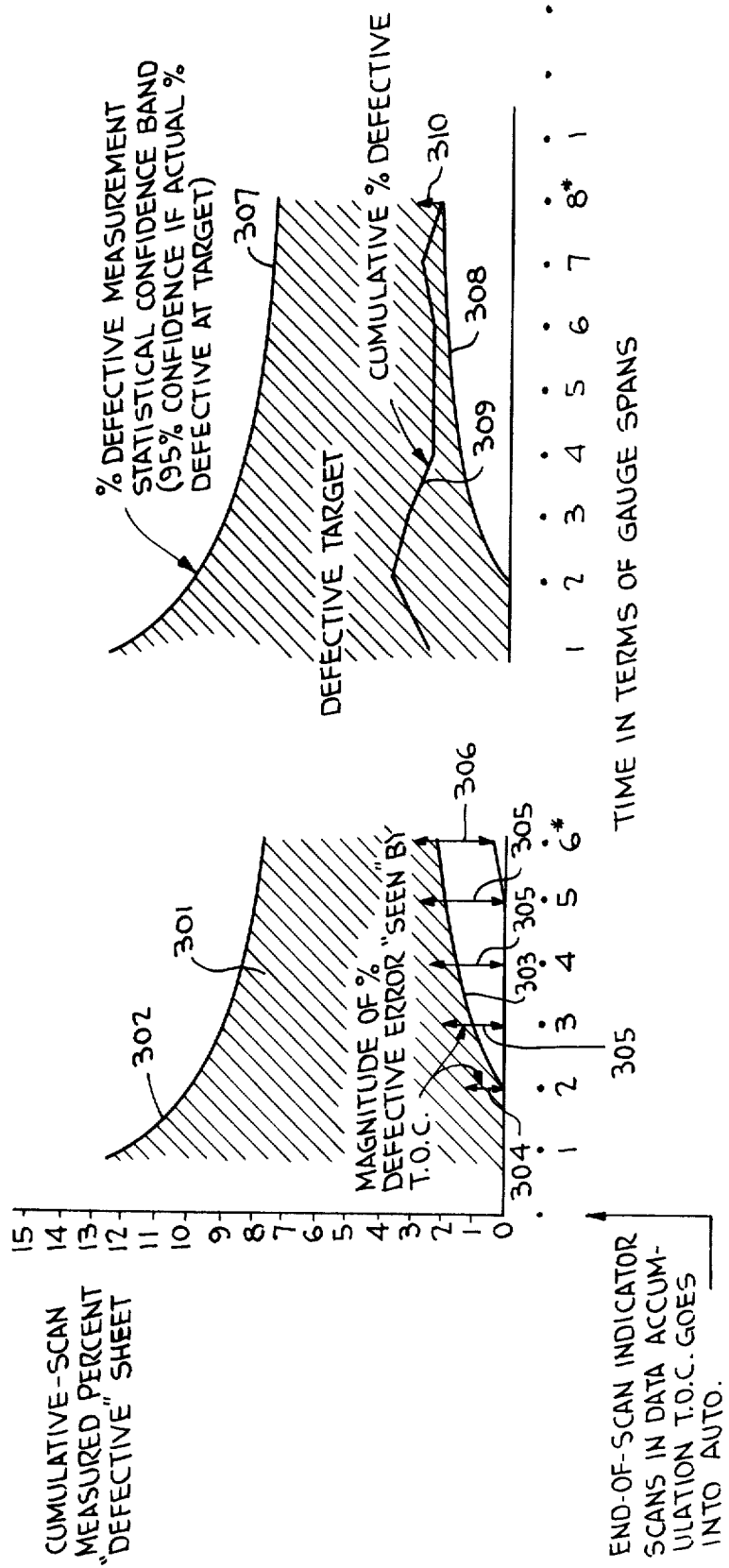
FIG. 3 represents waveforms helpful in analyzing the operation of the system of FIG. 2.

To provide a more complete understanding and description as to the manner by which the system of FIG. 2 operates, consideration is given to FIG. 3, where there are illustrated a series of curves indicating the manner in which the instrument percent defective (equal to 100 times fraction defective) varies as a number of scans of gauge 203 across sheet 201, as well as the manner in which corrective action may be taken in response to the computations made in accordance with the present invention.

Considering FIG. 3 in detail, it is assumed that a fraction defective setpoint of 0.05 (= 5 percent) is established, and a 95 percent confidence is desired in the fraction defective measurement made by the gauging system. Such an assumption results in the definition of an expected fraction defective curve that has an upper boundary that continuously decreases from a maximum value of approximately 12.25 after one scan to a value of five percent after an infinite number of scans. The upper boundary of the expected fraction defective curve is defined by hyperbola 302 that has an asymptote at five percent fraction defective. The lower boundary is defined by curve 303 which represents a hyperbola once the number of scans reaches about 2; hyperbola 303 also has an asymptote at five percent. For the situation illustrated in FIG. 3, the setpoint value for sheet average thickness is initially set at a high value, whereby no defective samples are detected for the first five scans of gauge 203.

Considering now the operation of the system after one scan wherein counts of zero are stored in counters 213 and 214, comparison network 236 derives a flag signal that inhibits gates 241 and 242 to prevent coupling of any possible flags from networks 225 and 232 to computer 227. The flag output signal of network 236 also cannot be coupled to setpoint computer 227 because neither comparison network 225 nor 232 is deriving a flag signal, and therefore AND gate 239 is blocked. It is evident that comparison networks 225 and 232 do not derive flag signals since the zero defects lie above the projection of line 303 to the left of two scans.

After the second scan has been completed, the value of curve 303 has increased so that it is slightly above the zero value for fraction defective. Therefore, the output signal of multiplier 228 is a signal having a magnitude that is slightly less than a 0.05 fraction defective value. This value is less than the 0.05 fraction defective error signal derived from absolute value network 231 under the assumed conditions, whereby comparison network 232 derives a flag signal. The flag signal, however, cannot pass through inhibit gate 242 because no defective samples have yet been detected, whereby a flag signal derived from network 236 inhibits gate 242. The flag signal from AND gate 238 is passed through AND gate 239 at this time because the flag signal from comparison network 232 passes through OR gate 238 to enable AND gate 239. Therefore, setpoint computer 227 calculates a value of CSD equal to $0.381\,(\mu_0 - RJ)$, which results in a shift in the setpoint for the average value of sheet thickness, to correct for a fraction defective error of magnitude as indicated by arrow 304, FIG. 3. The same sequence of operations occurs after scans 3, 4 and 5, with increasing changes in the average sheet thickness setpoint, as implied by arrows 305.

After the fifth scan has been completed, the average sheet thickness setpoint has been shifted downwardly by a sufficient amount to cause one defective sample to be derived during the sixth scan. The single defect results in a fraction defective output of divider 215.1 that is approximately 0.005. The 0.005 fraction defective output of divider 215 is compared with the fraction defective setpoint of 0.05 in difference matrix 229. The absolute value of the difference signal derived from matrix 229 is compared with the expected fraction defective value derived from multiplier 228, which now has a value of slightly more than 0.02. Comparison network 232 therefore derives a flag signal in response to the computed fraction defective error being outside of the expected fraction defective error. The flag signal derived by comparison network 232, however, now passes through inhibit gate 242 to enable resetting of counters 213, 217 and accumulator 212, and to enable setpoint computer 227 to derive CSD in accordance with the function relating limit value to actual cumulated average value and actual fraction defective. The computation of CSD by setpoint computer 227 as a result of the sixth scan results in a shift in the average sheet thickness setpoint by an amount implied by arrow 306.

Next, assume that the system has been properly operating within the boundary lines 307 and 308 for a relatively long time interval, such as eight scans. During this time interval, the cumulative fraction defective has a trajectory indicated by line 309, which is completely within the region defined by boundaries 307 and 308, and the single scan fraction defective is within the tolerable fraction defective limit of approximately 0.1225. Thereby, there has been no change in the average sheet thickness setpoint and there has been no resetting of the various cumulative counters and accumulators of the computer system.

Now assume that, after the eighth scan, the cumulative defect counter has counted eight total defects out of 320 samples to provide a fraction defective output of divider matrix 215.1 equal to 0.025. The 0.025 output signal of matrix 215.1 is compared with the 0.05 fraction defective setpoint derived from source 223, whereby there is derived a cumulative error fraction defective output signal of difference matrix 229. Simultaneously, multiplier 228 derives a signal to indicate that, for the 320 samples and under the desired 95 percent confidence level, the expected fraction defective differs from 5 percent by 0.0247. Thereby, the measured fraction defective exceeds the expected fraction defective and a flag signal is derived from comparison network 232. The flag signal is fed through inhibit gate 242 to activate setpoint computer 227 to compute a new average sheet thickness setpoint, as implied by arrow 310, and also to cause the various counters and accumulators of the computer system to be reset.

Next assume that a transient condition has occurred in extruder 202, causing a sudden decrease in the thickness of sheet 201, whereby during the next scan of gauge 203 across the sheet five defective samples are detected, whereby the output of counter 214 has a value of 0.125 at the end of the scan. Also assume that the system has been operating for a relatively long time interval, whereby the cumulative scan defective channel does not cause a flag signal to be derived by comparison network 232. Under the assumed conditions, the 0.125 signal is subtracted from the fraction defective setpoint (0.05) in matrix 222 and the resultant absolute value signal is compared with the output of multiplier 221 in comparison network 225. The output signal of multiplier 221 is approximately 0.1225, whereby a flag signal is derived from comparison network 225. The flag signal is passed through inhibit gate 241 to enable gate 226, whereby the average value of the last scan, as stored in accumulator 211, is fed to setpoint computer 227 and is utilized in the calculation of CSD for the quantity $\mu$.

While the principles of the present invention have been described in conjunction with a special purpose digital computer system, it is to be understood that the principles of the invention are applicable to systems employing properly programmed general purpose computers.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. Apparatus for controlling the average value of a material property in response to statistical variations of the property, said property having a limit value beyond which the material is considered defective, the apparatus controlling a setpoint for the average value so that a predetermined amount of the material has property values beyond the limit value, said predetermined amount being a fraction defective, comprising means monitoring the property for deriving a first signal indicative of measured variations of the property, means responsive to the first signal for deriving a second signal indicative of the spread of measured values since the last time the average setpoint value was changed, means for deriving a further signal indicative of the quantity of measurements used to form the second signal, means responsive to the further signal for deriving a third signal indicative of the expected spread of values for the fraction defective, means responsive to the further signal to cause the magnitude of the third signal to effectively approach a predetermined limit value from two sides as the quantity of measurements increases beyond a predetermined number since the last time the average setpoint value was changed, means responsive to the second and third signals for changing the average setpoint in response to the magnitude represented by the second signal exceeding the magnitude represented by the third signal, and means responsive to the changing means for varying the average value of the property in response to the change in setpoint.

2. The apparatus of claim 1 further including means responsive to the further signal indicating that the quantity of measurements is less than the predetermined number for providing a constant zero magnitude for the third signal on the lower side of the predetermined limit.

3. The apparatus of claim 1 wherein the means for changing the average setpoint further includes means responsive to the first signal for reducing the average setpoint value in response to zero measurements having values less than the limit value when the number of measurements is greater than a further number of measurements and less than the predetermined number of measurements.

4. In an apparatus for controlling a setpoint for the average value of a property of a material product, sampling means monitoring the property for deriving a first signal having values indicative of measured variations of the property over a time interval, means for deriving a further signal indicative of the number of samples used to form the first signal, computer means responsive to the first and further signals for deriving a second signal indicative of the percentage of the samples that is outside of a defect limit, means responsive to the second signal and a setpoint for the percentage for deriving a percentage error signal, means responsive to the further and error signals for deriving a flag signal in response to the error magnitude indicated by the error signal exceeding a multiple of a setpoint value for the percentage, means responsive to the number of samples used to form the first signal for causing the effect of the multiple of the setpoint value to decrease as the number of samples used to form the first signal increases, means for resetting the computer means to a starting point in response to the occurrence of the flag signal, and means responsive to the second signal and the flag signal for varying the setpoint by an amount dependent upon the percentage that caused the flag signal to be derived.

5. The apparatus of claim 4 further including means responsive to the further signal for enabling the flag signal deriving means only each time a predetermined number of the samples is taken.

6. The apparatus of claim 5 further including means responsive to the further and flag signals for activating the computer means to derive the second signal (a) for the samples occurring only in a first interval of one of the predetermined number of the samples even though a plurality of such intervals has occurred since the derivation of the last flag signal, and (b) for the samples occurring in a second interval of a plurality of the predetermined number of the samples from the last derivation of a flag signal, the second signal (a) being derived in response to each of said first intervals.

7. The apparatus of claim 6 wherein the means for activating includes means for deriving the second signal (a) and the second signal (b) after each first interval has been completed.

8. The apparatus of claim 7 wherein the plurality of intervals for deriving the second signal (b) consists of all of the first intervals occurring since the derivation of the previous flag signal.

9. The apparatus of claim 6 wherein the plurality of intervals for deriving the second signal (b) consists of all of the first intervals occurring since the derivation of the previous flag signal.

10. The apparatus of claim 4 wherein the means for varying the setpoint further includes: means responsive to the further signal for deriving a third signal indicative of the monitoring means fraction defective for the number of samples used to form the first signal, and means responsive to the second and third signals for comparing the magnitudes of the percentage of samples and monitoring means fraction defective to control the setpoint varying means.

11. In an apparatus for controlling a setpoint for the average value of a property of a material product, means monitoring the property for deriving a first signal having values indicative of measured variations of the property over a time interval, means for deriving a further signal indicative of the quantity of measurements used to form the first signal, computer means responsive to the first and further signals for deriving a second signal indicative of the spread of values of the first signal, means responsive to the second signal and a setpoint for the spread of values for deriving a spread of values error signal, means responsive to the further and error signals for deriving a flag signal in response to the error magnitude indicated by the error signal exceeding a multiple of a setpoint value for the spread of values of the first signal, means responsive to the quantity of measurements used to form the first signal for causing the effect of the multiple of the setpoint value to decrease as the quantity of measurements used to form the first signal increases, means for resetting the computer means to a starting point in response to the occurrence of the flag signal, and means responsive to the second signal and the flag signal for varying the setpoint by an amount dependent upon the spread of values of the first signal that caused the flag signal to be derived.

12. The apparatus of claim 11 further including means responsive to the further signal for enabling the flag signal deriving means only each time a predetermined quantity of measurements is made.

13. The apparatus of claim 12 further including means responsive to the further and flag signals for activating the computer means to derive the second signal (a) for the quantity of measurements occurring only in a first interval of a predetermined number of the quantity of measurements even though a plurality of such intervals has occurred since the derivation of the last flag signal, and (b) for the quantity of measurements occurring in a second interval of a plurality of the predetermined number of the quantity of measurements from the last derivation of a flag signal, the second signal (a) being derived in response to each of said first intervals.

14. The apparatus of claim 13 wherein the means for activating includes means for deriving the second signal (a) and the second signal (b) after each first interval has been completed.

15. The apparatus of claim 14 wherein the plurality of intervals for deriving the second signal (b) consists of all of the intervals occurring since the derivation of the previous flag signal.

16. The apparatus of claim 13 wherein the plurality of intervals for deriving the second signal (b) consists of all of the intervals occurring since the derivation of the previous flag signal.

17. The apparatus of claim 13 wherein the means for varying the setpoint further includes: means responsive to the further signal for deriving a third signal indicative of the monitoring means spread of values for the quantity of measurements used to form the first signal, and means responsive to the second and third signals for comparing the magnitudes of the measured spread of values and the monitoring means spread of values to control the setpoint varying means.

18. The apparatus of claim 11 wherein the means for activating includes means for deriving the second signal (a) and the second signal (b) after each interval has been completed.

19. A method of controlling the average value of a property of a material product comprising sampling the product to derive a first signal having values indicative of measured variations of the property over a time interval, deriving a further signal indicative of the number of samples used to form the first signal, deriving a second signal indicative of the percentage of samples that is outside of a defect limit, comparing the magnitude indicated by the second signal with a setpoint for the percentage of samples to derive a percentage error signal, deriving a flag signal in response to the error magnitude indicated by the error signal exceeding a multiple of a setpoint value for the percentage, causing the effect of the multiple of the setpoint value to decrease as the number of samples used to form the first signal increases, resetting the magnitude indicated by the second signal to a starting point in response to the occurrence of the flag signal, varying the setpoint by an amount dependent upon the percentage that caused the flag signal to be derived, and controlling the average value of the property in response to the variations of the setpoint.

20. The method of claim 19 further including the step of enabling the flag signal to be derived only each time a predetermined number of the samples is taken.

21. The method of claim 20 further including the step of deriving the second signal (a) for the samples occurring only in a first interval of one of the predetermined number of the samples even though a plurality of such intervals has occurred since the derivation of the last flag signal, and (b) for the samples occurring in a second interval of a plurality of the predetermined number of the samples from the last derivation of a flag signal, the second signal (a) being derived in response to each of said second intervals.

22. The method of claim 21 further including the step of deriving the second signal (a) and the second signal (b) after each first interval has been completed.

23. The method of claim 22 wherein the plurality of intervals for deriving the second signal (b) consists of all of the first intervals occurring since the derivation of the previous flag signal.

24. The method of claim 19 wherein the setpoint is varied by deriving a third signal indicative of a fraction defective of a monitoring means utilized to form the first signal, said monitoring means fraction defective decreasing as the number of samples used to form the first signal increases, and comparing the magnitudes indicated by the second and third signals to control the setpoint.

25. A method of controlling the average value of a property of a material product comprising monitoring the product to derive a first signal having values indicative of measured variations of the property over a time interval, deriving a further signal indicative of the quantity of measurements used to form the first signal, deriving a second signal indicative of the spread of values of the measurements to form the first signal, comparing the magnitude indicated by the second signal with a setpoint for the spread of values to derive a spread of values error signal, deriving a flag signal in response to the error magnitude indicated by the error signal exceeding a multiple of a setpoint value for the spread of values, causing the effect of the multiple of the setpoint value to decrease as the quantity of measurements used to form the first signal increases, resetting the magnitude indicated by the second signal to a starting point in response to the occurrence of the flag signal, varying the setpoint by an amount dependent upon the spread of values that caused the flag signal to be derived, and controlling the average value of the property in response to the variations of the setpoint.

26. The method of claim 25 further including the step of enabling the flag signal to be derived only each time a predetermined quantity of the measurements is made.

27. The method of claim 26 further including the step of deriving the second signal (a) for the measurements occurring only in a first interval of one of the predetermined quantity of the measurements even though a plurality of such intervals has occurred since the derivation of the last flag signal, and (b) for the samples occurring in a second interval of a plurality of the predetermined quantity of the measurements from the last derivation of a flag signal, the second signal (a) being derived in response to each of said first intervals.

28. The method of claim 27 further including the step of deriving the second signal (a) and the second signal (b) after each first interval has been completed.

29. The method of claim 28 wherein the plurality of intervals for deriving the second signal (b) consists of all of the first intervals occurring since the derivation of the previous flag signal.

30. The method of claim 25 wherein the setpoint is varied by deriving a third signal indicative of a spread of values of a monitoring means utilized to form the first signal, said monitoring means spread of values decreasing as the number of samples used to form the first signal increases, and comparing the magnitudes indicated by the second and third signals to control the setpoint.

* * * * *